March 6, 1951 J. H. KYLE 2,543,784
LUBRICATION SAFETY DEVICE
Filed Dec. 31, 1948 2 Sheets-Sheet 1

Inventor
JOSEPH H. KYLE

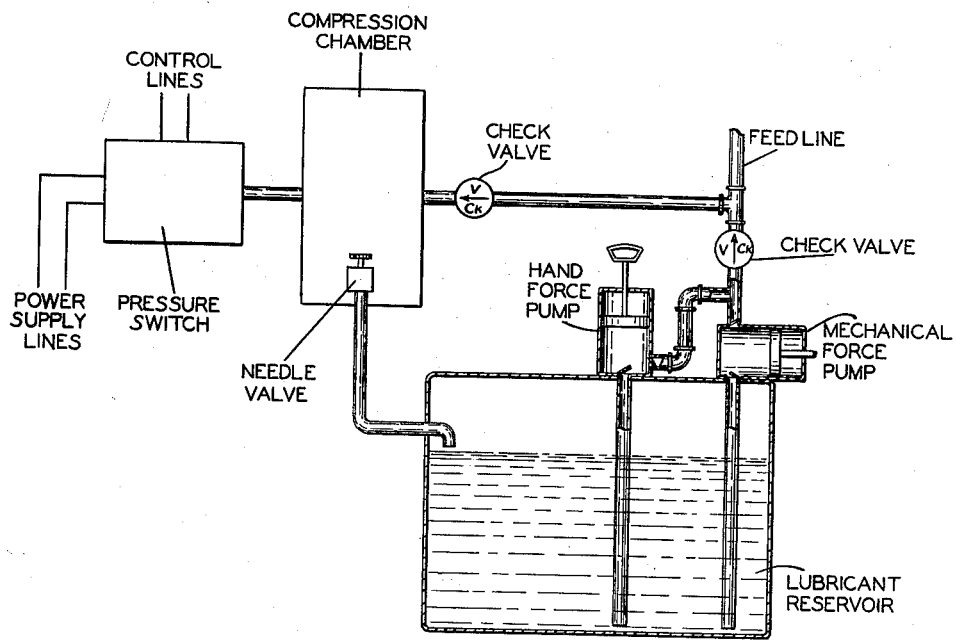

Patented Mar. 6, 1951

2,543,784

UNITED STATES PATENT OFFICE 2,543,784

LUBRICATION SAFETY DEVICE

Joseph H. Kyle, Lancaster, Pa., assignor to Armstrong Cork Company, Lancaster, Pa., a corporation of Pennsylvania Application December 31, 1948, Serial No. 68,639

7 Claims. (Cl. 184—6)

This invention relates to a lubrication safety device and is directed more particularly to a safety device for use in combination with lubricators which are effective for supplying metered quantities of lubricant at predetermined intervals. This type of lubricator is commonly employed on machines and is effective for supplying lubricant to the various moving parts requiring the same under pressure and at regular intervals. The pressure is at its maximum during the delivery stroke and gradually decays during the interval between such strokes, to a zero pressure in some instances. It is sometimes desirable to apply lubricant prior to starting a machine, and for that purpose, lubricators of the type referred to are generally provided with a hand pump which may be actuated to supply the lubricant under pressure to the moving parts before the machine is started. With lubricating systems of this type, it is not always possible to detect faulty operation of the pump or a break in the feed lines which convey the lubricant from the pump to the parts to be lubricated. Carelessness may also result in an inadequate supply of lubricant to the pump. As a result, expensive machines are damaged through lack of lubrication or insufficient lubrication which has not been promptly detected.

It is an object of my invention to provide a safety device which will be effective for preventing operation of a machine supplied with lubricant in the event the pump should fail, a feed line break, the supply of lubricant to the pump be exhausted, or other accident occur which reduces the pressure of the lubricant in the feed lines on the delivery stroke of the lubricant pump and results in improper lubrication or the absence of lubrication.

Another object of my invention is to provide a safety device for use with lubrication systems of the intermittent feed type which will prevent operation of the machine to be lubricated prior to the establishment of a proper supply of lubricant under pressure to the parts to be lubricated.

Generally stated, the device includes a compression chamber connected by a conduit to the lubrication feed line, a pressure switch actuated upon the development of a predetermined pressure within the compression chamber, and means for reducing the pressure within the compression chamber to an inoperative degree within a limited time interval in the event of failure of the lubrication system.

Figure 1:
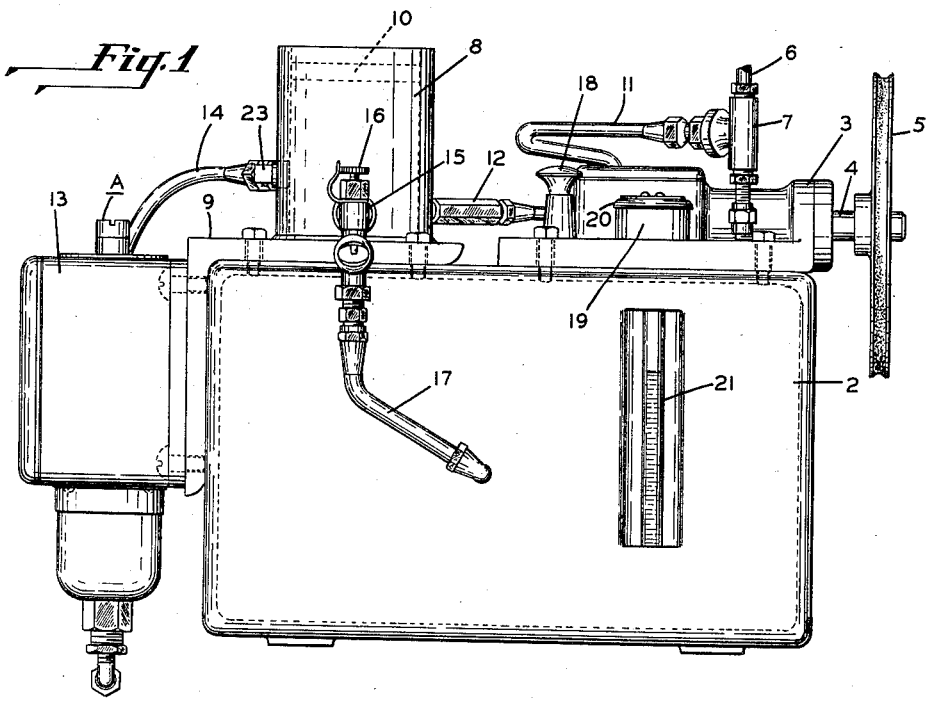
Figure 2:
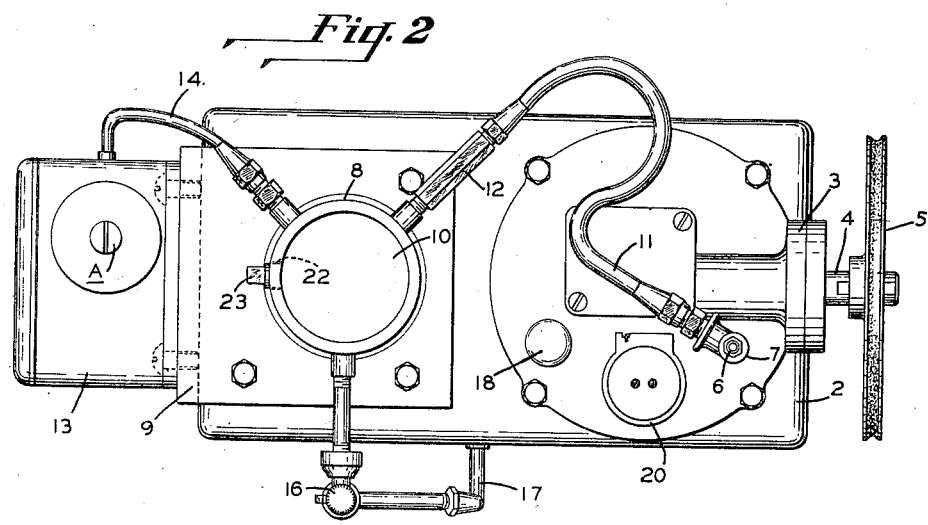

The invention will be described in conjunction with the attached drawing in which:

Figure 1 is an elevational view illustrating an embodiment of the present invention, Figure 2 is a top plan view of the arrangement shown in Figure 1, and Figure 3 is a diagrammatic or schematic representation of the general arrangement shown in Figures 1 and 2.

There is shown a lubricant reservoir 2 which has mounted thereon a pump 3. The pump has an operating shaft 4 upon which is mounted a pulley 5 which may be connected by a belt (not shown) to a pulley on the machine to be lubricated, or the pump 3 may be driven by a separate motor. The pump 3 may be a standard Bijur cyclic pump and may be adjusted to deliver 2 cubic centimeters of lubricant on each stroke and may be set so as to deliver such quantity once every 1½ minutes. The particular cycle of the pump and the quantity of lubricant supplied will vary, depending upon the requirements of the machine to be lubricated. The structure of the pump is not important and may be a cam actuated piston type pump, such as the Bijur cyclic pump mentioned above. Other types of pumps which supply lubricant intermittently may be substituted.

The discharge of the pump is through a feed line 6 which conveys the lubricant to the part or parts of the machine to be lubricated. A T connection 7 is provided in the feed line 6 and a check valve, not shown in the drawing, may be provided, preferably below the T connection 7 to prevent the discharge of lubricant to the pump 3 in the intervals between the pressure strokes of the pump. The Bijur cyclic pump has a built-in check valve.

A compression chamber 8 is mounted on the tank 2 by an angle 9 which is bolted to the tank. The compression chamber 8 may be formed of a section of pipe with a welded top 10 and with its lower edge welded into sealing engagement with the angle 9. This provides a fluid tight chamber 8. A conduit 11 connects the chamber 8 with the feed line 6 through the T connection 7. The particular location of the connection between the pump and compression chamber is not important so long as the conduit 11 and feed line 6 are both in communication with the pump for the delivery of lubricant therefrom. A ball check valve 12 is provided in the line 11, permitting the flow of lubricant into the compression chamber 8 but preventing egress of lubricant therefrom.

A pressure switch 13 is mounted on the angle 9 and may be any conventional type of switch which is actuated upon the development of a predetermined pressure within its actuating mechanism. A bellows type switch of the normally open type, capable of being closed upon the development of a pressure of 5 pounds per square inch within its actuating mechanism, will be satisfactory for most uses. Where a greater or lesser pressure is required, most pressure switches are provided with an adjusting arrangement as shown at A which is effective for bringing the switch into operation at any desired pressure. The pressure switch 13 is connected to the compression chamber 8 by a conduit 14. Either a normally open or normally closed switch may be used as will be obvious.

It will be observed that the compression chamber 8 together with the pressure switch 13 constitutes a closed system, with the check valve 12 permitting the supply of lubricant into the compression chamber to thereby increase the pressure within the closed system. A head of air will, of course, be confined above the level of the lubricant in the chamber 8.

The pressure switch is interconnected with the machine to be lubricated, and in the preferred arrangement the switch is effective for completing the circuit for the driving motor when a predetermined pressure is developed within the switch actuating mechanism and is effective for opening the circuit when the pressure falls below the desired minimum, for example, 5 pounds per square inch. This would be effective with a normally open switch directly connected to the motor. The switch may, of course, control a solenoid, a relay, or other control device which directly or indirectly controls the operation of the machine to be lubricated. It should be borne in mind that the pressure in the feed lines will depend upon the type of lubricant supplied and its viscosity, the size and length of the feed lines, and other variable factors. The pressure switch 13 will be adjusted to insure that such pressure is maintained on each delivery of the pump. Of course, the pressure will drop and may decay to zero in the interval between deliveries, but the check valve 12 will prevent any such decay in the compression chamber 8.

A needle valve 15 is connected into the compression chamber 8 and is effective for bleeding lubricant from the chamber 8 at a predetermined rate to slowly reduce the pressure within the compression chamber. A knurled knob 16 is provided on the valve 15 in order that the rate of bleeding may be adjusted. Preferably, a conduit 17 connects the needle valve with the reservoir 2 so that oil discharged from the compression chamber 8 is delivered back into the reservoir 2. This arrangement permits the discharge of lubricant at a rate which will be effective for reducing the pressure in the compression chamber 8 to a point where the switch 13 will move in inoperative position within a predetermined time interval, such as fifteen minutes, in the event of any breakdown in the lubrication system, resulting in failure of the periodic delivery of lubricant to the chamber 8. This rate of discharge of lubricant from the compression chamber 8 may be varied, depending upon conditions. In many machines the supply of lubricant may be discontinued for a period of ten to fifteen minutes without damage to the machine. The rate of bleeding should be adjusted so that it is not greater than the supply of lubricant to the compression chamber 8 and is effective for reducing the pressure in the chamber to render the switch 13 inoperative within a reasonably safe period of time upon failure of the lubrication system.

If the lubrication pump is driven from the machine to be lubricated, it is necessary to build up the pressure in the compression chamber 8 by delivering lubricant into the feed line 6 before the switch 13 will be rendered operative, permitting the machine to be lubricated to be started. This may be accomplished by use of a hand pump 18 forming part of the lubrication system. The hand pump may be so interconnected with the motor driven pump 3 that upon each stroke of the hand pump a quantity of lubricant equivalent to the quantity fed by the motor driven pump on each cycle will be delivered to the feed line 6.

In order to maintain an adequate supply of lubricant in the reservoir 2, an access opening 19 is provided, closed by a cover 20, and the supply of lubricant for the reservoir 2 may be replenished as needed through this opening. A glass gauge 21 may be provided in the reservoir 2 for a visual indication of the quantity of oil therein. These are conventional and are standard equipment on the Bijur cyclic pump.

An opening 22 may be provided in the compression chamber 8 to receive a pressure gauge (not shown) which can be used in adjusting the pressure switch 13. The adjustment screw A is rotated until actuation of the switch occurs when the pressure within the compression chamber 8 is at the desired degree, say 5 pounds per square inch, as indicated by the gauge. Thereafter the gauge is removed and a plug 23 is inserted to close the opening.

It is preferred to have the needle valve disposed close to the bottom of the compression chamber and to have the conduits 11 and 14 disposed a slight distance thereabove. This will insure that the conduits will be filled with lubricant during the normal operation of the lubrication system and any leak in the conduits or their connections can be detected. The head of air disposed above the oil level in the compression chamber will be confined by the walls of the chamber and there will be no problem of air leakage.

In the operation of the device, assuming that the machine to be lubricated is idle, the hand pump 18 will be actuated and lubricant will be supplied under pressure through the feed line 6 to the parts to be lubricated. Some of the lubricant will also pass through the conduit 11 and the check valve 12 into the compression chamber 8. As pumping continues, a pressure will be developed in the feed line 6 and in the compression chamber 8 which will be adequate to actuate the pressure switch 13; thereupon, the machine to be lubricated may be started. Lubricant will bleed from the compression chamber 8 through the needle valve 15 and the pressure within that chamber 8 will gradually fall unless it is reestablished by the pump 3 forcing lubricant in feed line 6 and into the compression chamber 8. Should the lubrication system fail to operate properly, the pressure in the chamber 8 will fall in a predetermined interval of time to a degree which will no longer be adequate to hold the switch 13 in operative position; thereupon, the machine to be lubricated will be stopped. If the lubrication device is operating properly, however, the pump 3 will periodically deliver lubricant under pressure to the feed line 6 and through the conduit 11 and check valve 12 into the chamber 8. The pressure developed in the system by the pump 3 by the periodic delivery of lubricant will be adequate to maintain the switch 13 in operative position, but should the pressure fall, through failure of the lubrication system, such as faulty operation of the pump, break in the feed line, or the consumption of all of the lubricant in the supply tank, the bleeding of the lubricant from the chamber 8 will, within a reasonable time, cause the pressure in the chamber 8 to fall below the desired minimum and the switch 13 will be rendered inoperative.

The quantity of lubricant bled from the chamber 8 is adjusted to insure that so long as the pump is delivering lubricant to the machine to be lubricated at the desired rate, the pressure in the compression chamber 8 will be adequate to maintain the switch 13 in operative position. In any event, the rate of bleeding from the compression chamber should not be in excess of the rate of flow of lubricant into that chamber from the feed line 6.

From the foregoing, it will be clear that by this arrangement it is possible to prevent operation of a machine lubricated by periodic deliveries of lubrication, should the pressure within the feed lines at the delivery stroke of the pump fall below a desired minimum adequate to maintain proper lubrication of the machine; and, in starting up, pressure of lubricant in the feed lines must be established before operation of the machine is possible.

While I have illustrated and described a preferred embodiment of my invention, it will be understood that the same is not limited thereto but may be otherwise embodied and practiced within the scope of the following claims.

I claim:

1. In a lubrication device including means for intermittently delivering lubricant under pressure to a feed line, the combination of: a compression chamber, a pressure switch, a conduit connecting said feed line and compression chamber for the periodic delivery of lubricant under pressure to said chamber to increase the pressure therein, a conduit connecting said compression chamber and pressure switch for the application of pressure to said switch, and means for bleeding lubricant from said compression chamber to reduce the pressure therein.

2. In a lubrication device including means for intermittently delivering lubricant under pressure to a feed line, the combination of: a compression chamber, a pressure actuated switch, a conduit connecting said feed line and compression chamber for the periodic delivery of lubricant under pressure to said chamber to increase the pressure therein, a check valve sealing said compression chamber from said feed line in a direction from the compression chamber to the feed line, a conduit connecting said compression chamber and pressure actuated switch for the application of pressure to said switch, and means for bleeding lubricant from said compression chamber at a rate no faster than the rate of lubricant supply to said compression chamber to reduce the pressure in said chamber upon failure of said lubrication device.

3. A device for use with a lubrication system including a lubricant reservoir and a lubricant pump for delivery of a measured quantity of lubricant from said reservoir to a feed line periodically under pressure with the pressure decaying in the interval between intermittent deliveries of lubricant, said device comprising: a compression chamber, a pressure actuated switch, a conduit connecting the pressure actuated switch to the compression chamber for the application of pressure to said pressure actuated switch to actuate the same, a conduit connecting said feed line and compression chamber for the periodic delivery of lubricant under pressure to said compression chamber to increase the pressure in said compression chamber, a check valve in said conduit permitting the flow of lubricant into said compression chamber and sealing the same against flow to said feed line in the opposite direction, and a needle valve connected to said compression chamber for the measured flow of lubricant from said pressure chamber to reduce the pressure therein upon failure of periodic delivery of lubricant to said pressure chamber from said feed line.

4. In a lubrication safety device the combination of: means for periodically delivering lubricant under pressure to a feed line, a compression chamber, a pressure actuated control device for the machine to be lubricated, a conduit connecting said feed line to said compression chamber for the delivery of lubricant under pressure into said chamber to increase the pressure therein, a conduit connecting said compression chamber to said pressure actuated control device for the application of pressure to said control device, and means for bleeding lubricant from said compression chamber to reduce the pressure therein upon failure of the supply of lubricant to said chamber.

5. In a lubrication safety device the combination of: a lubricant pump for periodically delivering lubricant under pressure, a feed line connected to said pump, a compression chamber, a pressure switch rendered operative upon the development of a predetermined pressure within its actuating mechanism and normally inoperative, a conduit connecting said feed line and compression chamber for the delivery of lubricant under pressure into said compression chamber to increase the pressure therein, a conduit connecting said compression chamber and pressure switch for the application of pressure to said pressure switch to render the same operative, and means for bleeding lubricant from said compression chamber to reduce the pressure within said compression chamber and render said pressure switch inoperative upon failure of supply of lubricant to said chamber.

6. In a lubrication safety device the combination of: a lubricant pump for the periodic delivery of lubricant under pressure, a feed line connected to said pump, a compression chamber, a pressure switch, a conduit connecting said feed line and compression chamber for the delivery of lubricant under pressure into said compression chamber to increase the pressure therein, a conduit connecting said compression chamber and pressure switch for the application of pressure to said pressure switch, and means for bleeding lubricant from said compression chamber at a rate less than the rate of lubricant supply to said feed line to reduce the pressure within said compression chamber, whereby failure in the delivery of lubricant under pressure periodically to said compression chamber will result in a pressure drop in said compression chamber as lubricant is bled therefrom and said pressure switch will be rendered inoperative.

7. In a lubrication safety device the combination of: a lubricant pump for the periodic delivery of lubricant under pressure, a feed line connected to said pump, a compression chamber, a normally open pressure switch adapted to be closed upon the development of a predetermined pressure within its actuating mechanism, a conduit connecting said feed line and pressure chamber for the delivery of lubricant under pressure into said compression chamber to increase the pressure therein, a check valve in said conduit permitting the flow of lubricant from said feed line to said compression chamber but sealing said compression chamber against the egress of lubricant therefrom through said conduit, a conduit connecting said compression chamber and pressure switch for the application of pressure to said pressure switch, and means for bleeding lubricant from said compression chamber at a rate not greater than the rate of lubricant supply to said compression chamber, said means for bleeding constituting the sole means of egress of lubricant from said compression chamber.

JOSEPH H. KYLE.

REFERENCES CITED

The following references are of record in the file of this patent:

UNITED STATES PATENTS

| Number | Name | Date |
|---|---|---|
| 1,387,746 | Webb | Aug. 16, 1921 |
| 2,143,533 | Archea | Jan. 10, 1939 |
| 2,160,778 | Dall | May 30, 1939 |
| 2,384,590 | Baldenhofer | Sept. 11, 1945 |